Jan. 3, 1928.

G. DUBREUIL 1,655,093

JOINT FOR VISIBLE DISPENSING APPARATUS FOR LIQUIDS

Filed March 18, 1926

Inventor:
Gaston Dubreuil,
By Hunter and Mason
Attorneys.

Patented Jan. 3, 1928.

1,655,093

UNITED STATES PATENT OFFICE.

GASTON DUBREUIL, OF LEVALLOIS-PERRET, FRANCE, ASSIGNOR TO SOCIETE ANONYME POUR TOUS APPAREILLAGES MECANIQUES, OF LEVALLOIS-PERRET, FRANCE, A FRENCH SOCIETY.

JOINT FOR VISIBLE DISPENSING APPARATUS FOR LIQUIDS.

Application filed March 18, 1926, Serial No. 95,697, and in Belgium June 12, 1925.

The present invention relates to joints for inflammable liquid dispensing apparatus. It aims to provide, for devices of this kind a tight joint between the glass cisterns employed to show the liquid being dispensed and the metallic parts upon which the cistern is supported. It aims further to provide for such apparatus, a joint responsive to thermal changes in the cistern.

The invention will now be described with reference to the accompanying drawings in which:—

Figure 1:
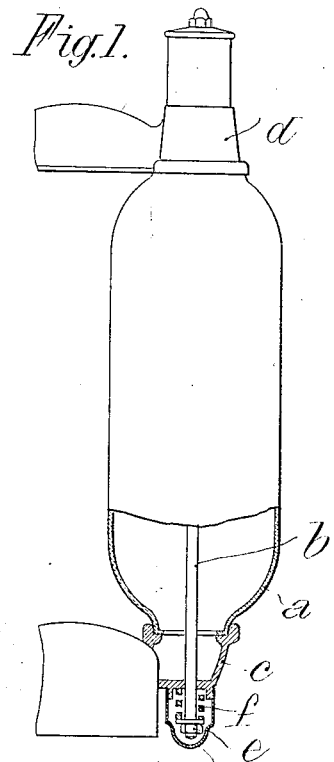
Fig. 1 represents an elevation, partially in section, of the joint applied to an ordinary glass gasoline cistern.

Turning to Fig. 1 of the drawings, there is shown a glass cistern $a$ which is supported on the bracket $c$ through which, for example, the liquid to be dispensed may be forced into and withdrawn from the visible cistern $a$. A cover $d$ is located upon the top of the cistern $a$ and forms a staunch joint with regard thereto. This cover may be supported from the frame of the dispensing apparatus in known manner. The cistern $a$ itself is held firmly between the parts $c$ and $d$ by a bolt $b$ which passes through apertures in both of these parts and is supplied at its upper end with an ordinary head so that it is held in invariable relationship at the upper end with regard to the part $d$; and at its lower end, this rod is provided with a nut $e$ which fits against a rubber washer which in turn is in contact with a compression spring $f$. A cap $g$ may be provided to enclose the parts $e$ and $f$.

It is evident that with this form of joint, expansion or contraction of cistern $a$ is taken care of by spring $f$ and firm contact will be maintained under all temperature conditions between the cistern and its metallic supports. It will be understood, of course, that the usual packing is provided between the rod $b$ and the bracket $c$ so as to prevent any leakage of the liquid being measured.

The drawings have only shown a portion of the apparatus. The glass cistern measuring chamber is intended for use in connection with a dispensing apparatus shown in the patent granted to M. C. Carbonaro Dec. 28, 1926, No. 1,612,488. The upper supporting member $d$ is formed as a part of the cross bracket shown in the patent. The improved mounting for the glass cistern disclosed may, of course, be used in connection with other types of dispensing apparatus.

Figure 2:
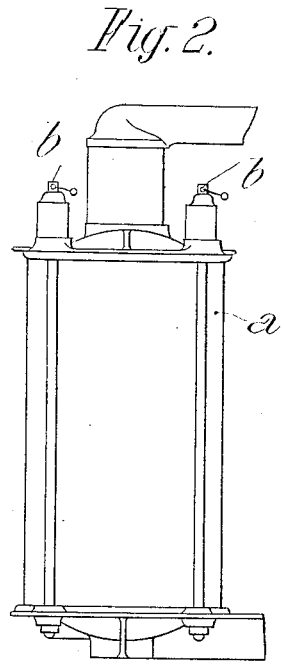
Fig. 2 is an elevation of a cistern with the joint applied externally of the cistern.
Figure 3:
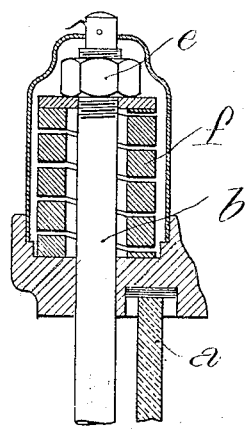
Fig. 3 is a plan of the apparatus shown in Fig. 2.
Figure 4:
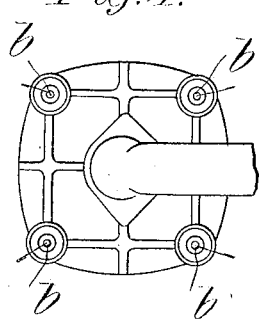
Fig. 4 is a section showing in detail the joint used in the apparatus shown in Fig. 2.

In the modification shown in Figs. 2, 3 and 4, the bolt $b$ is arranged externally, instead of internally of the cistern and the spring $f$ is placed on the top instead of on the bottom of bolt $b$.

It is to be understood that I do not wish to limit myself to the particular construction hereinbefore described or to the particular application of the invention to inflammable liquid dispensing apparatus.

What I claim is:—

1. In a dispensing apparatus for liquids, the combination of a support member, a glass shell mounted on said support member and having a sealed joint with regard thereto, a cover member mounted on said glass shell and having a sealed joint with regard thereto, a clamping rod extending between said support and cover members to maintain said sealed joints tight, said rod and said glass shell having different coefficients of expansion, and resilient means cooperative with said rod and one of said members to permit said differential expansion and contraction and maintaining said tight joints.

2. In a dispensing apparatus for liquids, the combination of a support member, a glass shell mounted on said support member and having a sealed joint with regard thereto, a cover member mounted on said glass shell and having a sealed joint with regard thereto, a clamping rod extending through said support and cover member to maintain said sealed joints tight, said rod and said glass shell having different coefficients of expansion under the influence of temperature, means on said rod to engage one of said members, a spring surrounding the rod and engaging the other of said members, and means on said rod to maintain said spring under compression, said means and spring cooperating with said rod to maintain said sealed joints tight irrespective of temperature variations.

In testimony whereof I have hereunto set my hand.

GASTON DUBREUIL.